United States Patent [19]

Garner, Sr.

[11] Patent Number: 4,525,115

[45] Date of Patent: Jun. 25, 1985

[54] TACK SYSTEM

[76] Inventor: Ronald S. Garner, Sr., P.O. Box 545, Dayton, Ohio 45402

[21] Appl. No.: 597,638

[22] Filed: Apr. 6, 1984

[51] Int. Cl.[3] .............................................. F16B 15/00

[52] U.S. Cl. .................................. 411/457; 40/158 A

[58] Field of Search ............... 411/457, 469, 473, 474, 411/921; 248/216.1; 24/153, 153.1, 154, 67 PR, 67 CF; 40/158 A

[56] References Cited

U.S. PATENT DOCUMENTS

| | | | |
|---|---|---|---|
| 1,189,604 | 7/1916 | Miley | 411/439 X |
| 2,623,431 | 12/1952 | Scheurmann | 411/921 X |
| 3,121,365 | 2/1964 | Hayashi | 411/439 |
| 3,205,757 | 9/1965 | Kuennen | 411/473 X |

FOREIGN PATENT DOCUMENTS

| | | | |
|---|---|---|---|
| 347924 | 1/1922 | Fed. Rep. of Germany | 411/457 |
| 811449 | 8/1951 | Fed. Rep. of Germany | 411/457 |

*Primary Examiner*—Gary L. Smith
*Assistant Examiner*—Adrian H. Whitcomb, Jr.
*Attorney, Agent, or Firm*—Biebel, French & Nauman

[57] ABSTRACT

A tack system having at least two tack elements, each tack element including a body having upper and lower opposing faces, and a plurality of pins extending through the body and positioned in a predetermined pattern. Each pin includes a spike portion protruding from the lower face and a shank portion having a bore defining a hole for receiving a spike portion of another tack element. A first tack element may be mounted on a bulletin board or the like to attach a sheet of material thereto, and a second tack element attached to the first tack element in stacked relation to hold a sheet of material therebetween by inserting the spike portions of the second tack element into the bores of the first tack element. In order to secure the tack elements in stacked relation, the spike portions include serrations to grip the bores of associated tack elements.

8 Claims, 5 Drawing Figures

TACK SYSTEM

BACKGROUND OF THE INVENTION

The present invention relates to pins, tacks and other instruments used to attach articles to bulletin boards and the like and, more particularly, to tacks adapted to be attached to a bulletin board or to each other in a stacked relation.

A problem inherent with all bulletin boards and other structures performing a similar function is that they lack means for the orderly display of notices which are attached to them, with the result that such bulletin boards often become cluttered with notices, making it difficult to find a particular notice. In addition, there is no present device which permits related notices to be grouped together on a bulletin board.

There are many types of tacks designed specifically for use with bulletin boards. For example, the Hayashi U.S. Pat. No. 3,121,365 and Miley U.S. Pat. No. 1,189,604 disclose tacks having heads with resilient members for gripping sheets of material to be attached to the bulletin board. These tacks possess an advantage over prior art tacks in that they need not be removed from the bulletin board to which they are attached, then reattached to pierce the sheet material to be mounted. Rather, the resilient member is adjusted to clamp the sheet to be mounted on the bulletin board, and can be readjusted to release the sheet when the sheet is no longer needed.

However, a disadvantage with such types of tacks is that they do not sufficiently eliminate the tendency of such bulletin boards to become cluttered with sheets of messages and notices. Furthermore, they do not facilitate the grouping of related notices on a board. Accordingly, there is a need for a tack system which promotes the orderly display of notices on bulletin boards and the like and which facilitates the grouping of related notices.

SUMMARY OF THE INVENTION

The present invention is a tack system adapted for use with bulletin boards and the like and consisting of a plurality of tack elements which can be attached to each other in a stacked relation so that notices can be held between tack elements and between the lowermost tack element and the bulletin board in stacked relation as well. Each tack element has a body which includes upper and lower opposing faces and a plurality of pins extending through the body and arranged in a predetermined pattern. Each pin includes a spike portion which protrudes outwardly from the lower face, and a shank portion which extends through the body and includes a bore extending inwardly from the upper face and shaped to receive the spike of an adjacent one of the tack elements. The pattern of pins is the same on each tack element so that a lowermost tack element may be attached to a bulletin board, a second tack element attached to it by inserting its spike portions into the bores of the lowermost tack element, and successive tack elements attached to the tack element in similar fashion.

In a preferred embodiment, the tack elements include at least four or five pins so that the lowermost tack element may be attached to a bulletin board sufficiently securely to support a plurality of other tack elements in stacked relation, as well as the notices held between the elements. In order to ensure that one tack element attaches securely to the tack element beneath it, the spike portions include serrations which grip the walls of the bores of the tack element beneath it and prevent the inadvertent dislocation of one tack element from another.

Also in the preferred embodiment, each tack element includes opposing recesses shaped to receive the thumb and forefinger of a user which facilitate the grasping of a tack element to separate it from or to attach it to the tack element beneath it. Each tack element may be formed to have a specific geometric shape such as a circle, trapezoid, rectangle, diamond or the like in order to provide a pleasing appearance. Additionally, certain geometric shapes may be preferable to others in a particular application. For example, oblong tack elements may be preferable to tack elements of other shapes in order to attach sheet material which is relatively large or which has a relatively large width dimension.

Accordingly, it is an object of the present invention to provide a tack system which promotes the orderly display of notices on bulletin boards and the like; a tack system in which a plurality of tack elements are adapted to be attached to each other in stacked relation so that messages and notices may be held between elements in stacked relation; a tack system having tack elements which may be easily and inexpensively manufactured in a variety of geometric shapes to facilitate the mounting of large or irregularly shaped notices on bulletin boards; and a tack system having a plurality of attachable tack elements specifically shaped to facilitate their being grasped by a user when attaching them to each other or separating them from each other.

Other objects and advantages of the invention will be apparent from the following description, the accompanying drawings and the appended claims.

DETAILED DESCRIPTION OF THE PREFERRED EMBODIMENTS

Figure 1:
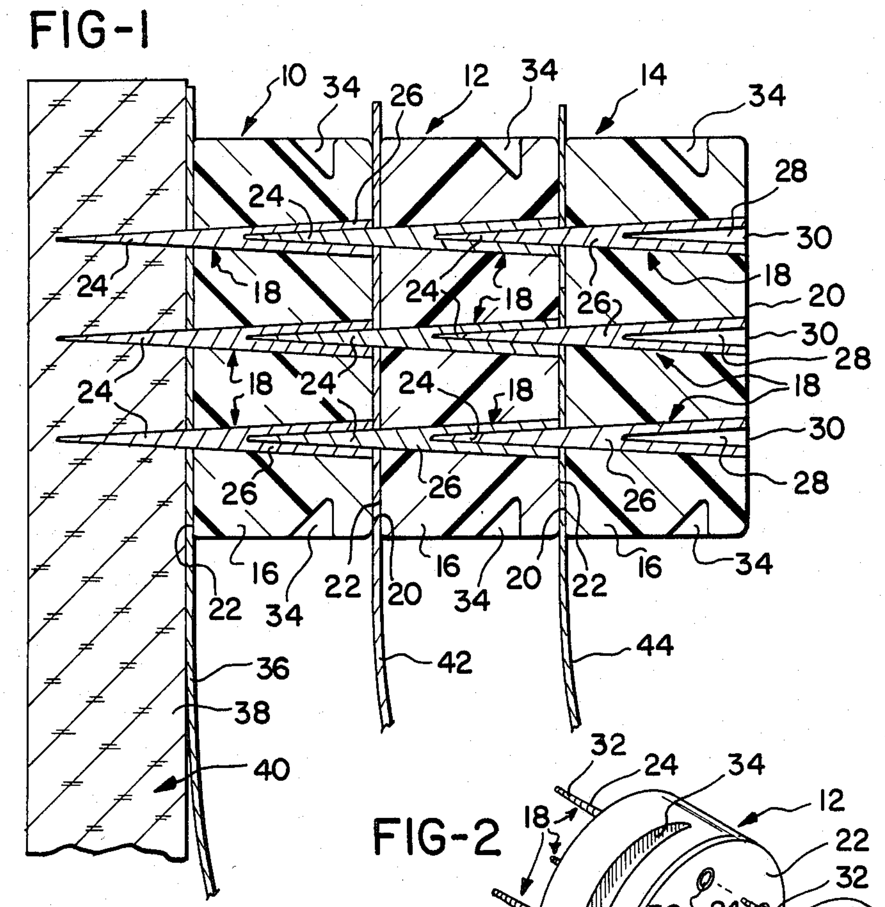
FIG. 1 is a side elevation in section of a preferred embodiment of the tack system of the present invention, shown attached to a section of a bulletin board.
Figure 2:
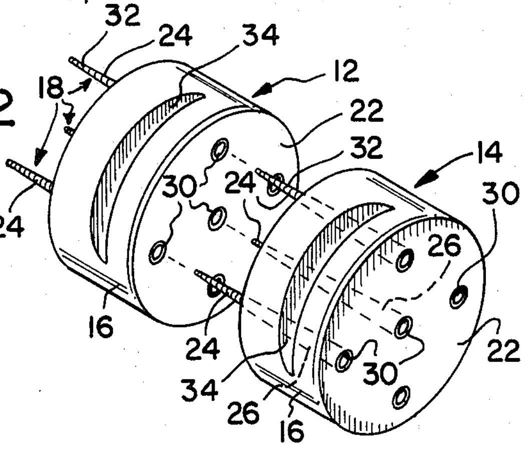
FIG. 2 is a perspective view of two tack elements of the embodiment of FIG. 1 in a separated relation.

As shown in FIGS. 1 and 2, the tack system of the present invention includes a plurality of tack elements 10, 12, 14 of identical construction. Each of the tack elements 10–14 includes a body 16 and a plurality of pins 18 extending through the body in a predetermined pattern. The bodies 16 and pins 18 may be made of a variety of materials suitable for such uses, but in a preferred embodiment, the bodies are made of plastic which is molded around the pins which are made of a low carbon steel.

The bodies 16 are generally cylindrical in shape and include substantially parallel, opposing upper and lower faces 20, 22. The pins 18 each includes a spike portion 24 which protrudes from the lower face 22 of the body 16 to which it is attached, and a shank portion 26. The shank portions 26 extend through the bodies 16 and include bores 28 in their outer ends which open to the upper faces 20 of the bodies to form holes 30. The bores 28 are shaped to receive the spike portions 24 of an upper adjacent one of the tack elements 10–14.

As shown in FIGS. 1 and 2, the pins 18 are oriented in the bodies 16 in a predetermined pattern which is the same for each body. Thus, the tack elements 10–14 can be attached to each other in stacked relation by inserting the spike portions 24 of tack element 12 into the holes 30 and bores 28 of tack element 10, and inserting the spike portions of tack element 14 into the bores 28 of tack element 12. In order to prevent tack element 12 from separating from tack element 10, and tack element 14 from separating from tack element 12, the spike portions 24 of each tack element include serrations 32, shown somewhat schematically in FIG. 2, which grip the walls of the bores in which the spike portions are inserted to prevent the inadvertent separation of the spike portion from the bore. In another preferred embodiment, the spike portions 24 and bores 28 can be dimensioned to provide an interference fit which provides sufficient gripping relation between the tack elements to obviate the use of serrations.

In order to facilitate the gripping of the tack elements 10–14 by the hand of a user, the body 16 of each tack element includes opposing notches 34 shaped to be gripped by the thumb and forefinger of the user.

Figure 5:
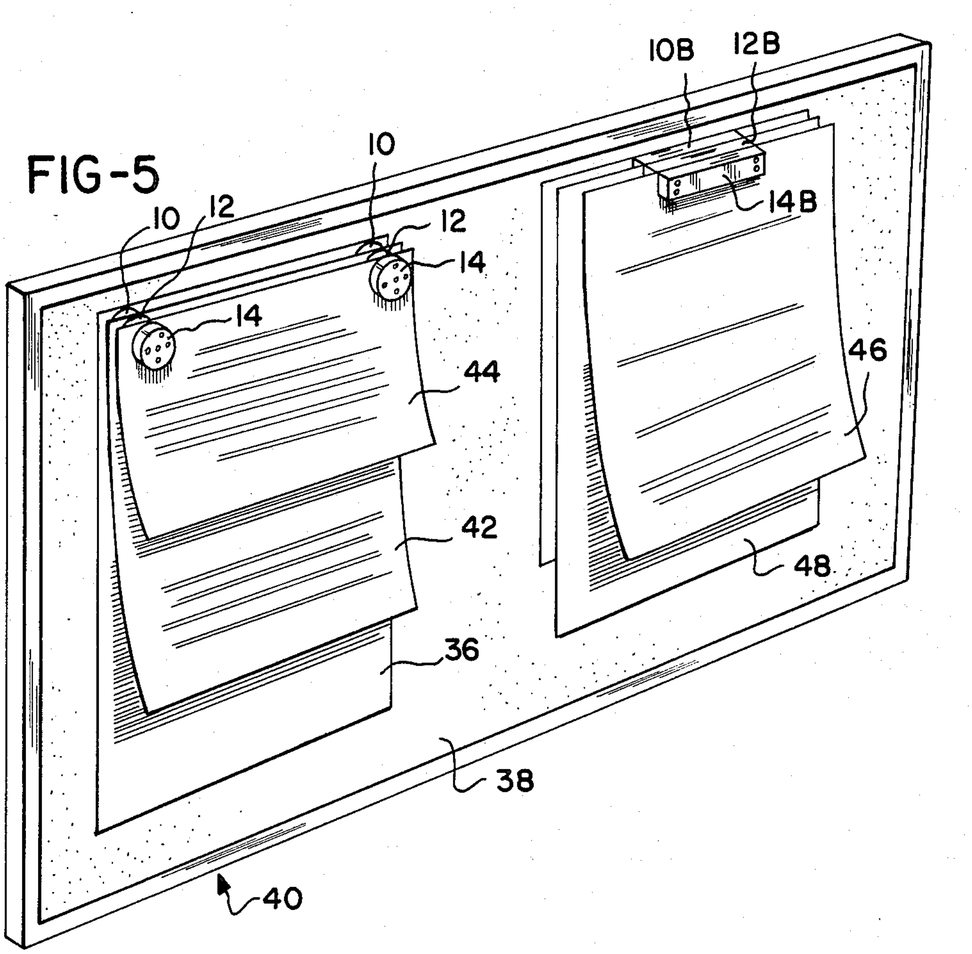
FIG. 5 is a perspective view of a bulletin board mounting two embodiments of the invention, each shown supporting a plurality of sheets.

The use of the tack system is shown best in FIGS. 1 and 5. A sheet 36 of material to be mounted on the penetrable surface 38 of a bulletin board 40 is placed in position on the board. Two lowermost tack elements 10 are used to mount the sheet 36 on the bulletin board 40 by pressing the element against the sheet so that the spike portions 24 pierce the sheet and penetrate into the surface 38. A second sheet 42 is mounted on the bulletin board 40 on top of the sheet 36 using two tack elements 12. These tack elements 12 are placed in superposed position to tack elements 10 so that their spike portions 24 are in registry with the holes 30 of the tack elements 10. The tack elements 12 are then pressed against the tack elements 10 so that their spike portions 24 pierce the sheet 42 and enter the bores 28 of tack elements 10, thereby securing sheet 42 to tack elements 10.

The process is the same for attaching top sheet 44 to the bulletin board 40. Tack element 14 is placed in superposition and registry with tack element 12 and pressed against the sheet 44 such that the spike portions 24 of tack element 14 pierce the sheet and enter the bores 28 of tack element 12.

It should be noted that this process can be repeated to attach additional sheets (not shown) by means of additional tack elements which are attached in stacked relation to tack element 14 shown in FIGS. 1 and 5. Furthermore, the tack elements are substantially identical in design so that they may be stacked in a different order than as shown in FIGS. 1 and 2. The use of five pins 18 with each tack element ensures that the lowermost tack element 10 is attached to the surface 38 of the bulletin board 40 sufficiently securely to support the weight of a number of additional tack elements and sheets.

Figure 3:
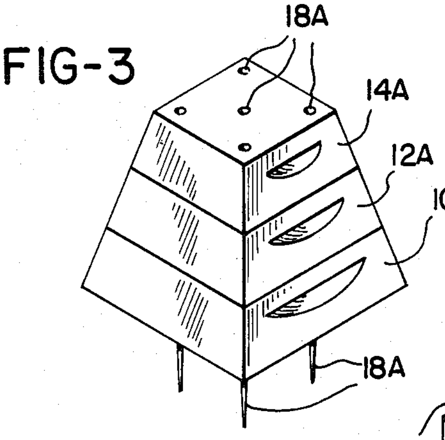
FIG. 3 is a perspective view of another embodiment of the present invention having a trapezoidal shape in elevation.

FIG. 3 shows an alternate embodiment of the invention in which a tack system consists of tack elements 10A, 12A, 14A, each having a trapezoidal shape in elevation. When attached in stacked relation, the tack elements 10A–14A together form the shape of a trapezoid and thereby provide a pleasing aesthetic appearance. It should be noted that, regardless of the shape of the individual elements 10A–14A, the pattern and spacing of the pins 18A of each tack element is the same so that the shank portions of each pin can be inserted into the bores of the tack element beneath it.

Figure 4:
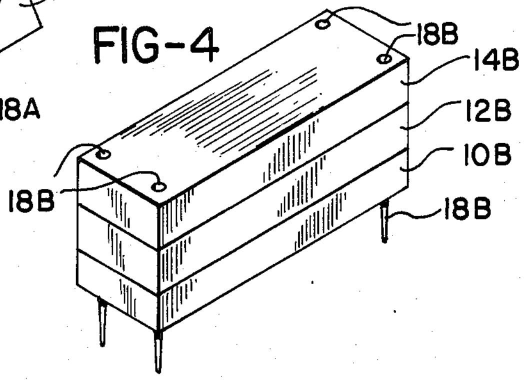
FIG. 4 is another embodiment of the invention in which each tack element is oblong in shape.

FIG. 4 shows another embodiment of the invention in which tack elements 10B, 12B, 14B each have an oblong, rectangular shape. Each of the tack elements 10B–14B also includes an identical pattern of four pins 18B at the corners of the rectangular shape. In addition to providing an aesthetically pleasing appearance, the specific shape of the tack elements 10B–14B facilitates the mounting of large sheets of paper 46, 48 to a bulletin board 40, as shown in FIG. 5. Because of the relatively large lateral spacing between pins 18B of the tack elements 10B–14B, single tack elements may be utilized to mount sheets 46, 48 on the board where multiple stacks of tack elements 10A–14A are required where the pins are relatively closely spaced.

It should be noted that the bodies of the tack elements of the invention may be formed in any number of geometric shapes such as diamonds, hexagons, and the like without departing from the scope of the invention. Different patterns of pins may also be employed, as well as different numbers of pins for each tack element, without departing from the scope of the invention.

While the forms of apparatus herein described constitute preferred embodiments of this invention, it is to be understood that the invention is not limited to these precise forms of apparatus, and that changes may be made therein without departing from the scope of the invention.

What is claimed is:

1. For use with bulletin boards and the like, a tack system comprising:

a first tack element having a body including upper and lower opposing faces, pin means protruding outwardly from said lower face, and said upper face having bores therein in a predetermined pattern;

a second tack element having a body including upper and lower opposing faces, and pin means protruding outwardly from said lower face of said second element in said predetermined pattern and shaped to be inserted in said bores so that said second element may be stacked on said first element; and means for holding said second tack element against said first tack element in stacked relation.

2. The tack system of claim 1 wherein said holding means includes said bores being sized to receive said pins of said second tack element in an interference fit therewith.

3. The tack system of claim 1 wherein said holding means includes said pins of said second tack element having serrations for gripping said body of said first tack element when positioned in said bores.

4. The tack system of claim 1 wherein said pin means of said first tack element comprises a plurality of pin members, each of said pin members having a spike portion extending from said lower face of said first element and a shank portion extending through said body thereof and including said bore shaped to receive one of said pin means of said second element.

5. The tack system of claim 4 wherein said pin means of said second tack element comprises a plurality of pin members, each of said pin members having a spike portion extending from said lower face of said second element and a shank portion extending through said body thereof and including said bore shaped to receive pin means of said first element such that said first element may be stacked on said upper face of said second element in a reverse stacked relation.

6. The tack system of claim 5 wherein said first and second elements each include opposing indentations on said bodies thereof adapted to be grasped by a thumb and forefinger of a user.

7. For use with bulletin boards and the like, a tack system comprising:

first and second tack elements, each element having a body including upper and lower opposing faces, a plurality of pin members extending through said body in a predetermined pattern, each pin member having a spike portion protruding from said lower face and a shank portion extending through said body to said outer face thereof and having a bore shaped to receive a spike portion therein such that said tack elements may be attached to each other by inserting said spike portions of said second element into said bores of said first element to secure a sheet of paper or the like therebetween, and said spike portions of said first element inserted into a bulletin board or the like to secure a second sheet of paper or the like thereto;

said spike portions having serrations therein whereby said spike portions may be fixed within corresponding ones of said bores; and each of said bodies having opposing indentations thereon shaped to be grasped by a thumb and forefinger of a user.

8. For use with bulletin boards and the like, a tack system including a plurality of tack elements, at least one of said tack elements comprising:

a body having opposing upper and lower faces;

pin means protruding outwardly from said lower face;

said upper face having bores therein in a pattern corresponding to a pattern of pin means on a second one of said tack elements, said holes sized to receive said pin means of said second tack element; and means for retaining said pin means of said second tack element within said holes.

* * * * *